US012743223B2

(12) United States Patent
Murray et al.

(10) Patent No.: US 12,743,223 B2
(45) Date of Patent: Sep. 22, 2026

(54) AGGREGATING DATA UNITS IN A DEDUPLICATION STORAGE SYSTEM

(71) Applicant: Hewlett Packard Enterprise Development LP, Spring, TX (US)

(72) Inventors: Callum Murray, Bristol (GB); Andrew Skinner, Bristol (GB); David Malcolm Falkinder, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/956,468

(22) Filed: Nov. 22, 2024

(65) Prior Publication Data

US 2026/0147498 A1 May 28, 2026

(51) Int. Cl.
*G06F 3/06* (2006.01)

(52) U.S. Cl.
CPC .......... *G06F 3/0641* (2013.01); *G06F 3/0619* (2013.01); *G06F 3/0683* (2013.01)

(58) Field of Classification Search
None
See application file for complete search history.

(56) References Cited

U.S. PATENT DOCUMENTS 8,332,404 B2 12/2012 Camble et al.
8,639,669 B1 * 1/2014 Douglis .................. G06F 3/061 707/692
9,223,794 B2 * 12/2015 Therrien ............. G06F 11/1453
9,465,808 B1 * 10/2016 Karr .................... G06F 16/1748
10,365,974 B2 7/2019 Todd et al.
11,550,493 B2 1/2023 Falkinder et al.
2015/0066877 A1 * 3/2015 Lillibridge .......... G06F 16/1752 707/692
2018/0198765 A1 * 7/2018 Maybee ................ G06F 3/0641
2020/0042253 A1 * 2/2020 Patwardhan .......... G06F 3/0638
2024/0361937 A1 * 10/2024 Thakkar ................ G06F 3/0619
2024/0370440 A1 * 11/2024 Veselova ........... G06F 16/24556
2024/0419350 A1 * 12/2024 Jain ..................... G06F 11/1004

OTHER PUBLICATIONS

Eshghi et al., “A Framework for Analyzing and Improving Content-Based Chunking Algorithms,” 2005, HP Laboratories Palo Alto, Technical Report, HPL-2005-30(R.1), 11 pages.
BingChun Chang, “A Running Time Improvement for Two Thresholds Two Divisors Algorithm,” 2009, Master’s Projects, San Jose State University, 38 pgs.

* cited by examiner

*Primary Examiner* — Reginald G Bragdon
*Assistant Examiner* — Ralph A Verderamo, III
(74) *Attorney, Agent, or Firm* — Trop, Pruner & Hu, P.C.

(57) ABSTRACT

Example implementations relate to deduplication operations in a storage system. An example includes receiving a set of data units to be stored in persistent storage of a deduplication storage system, and recording the arrival order of the set of data units in a manifest. The example also includes, in response to determining that an average unit size of the set of data units is smaller than a minimum size threshold, identifying a first data unit that is smaller than the minimum size threshold. The example also includes generating an aggregated data unit including the first data unit and a second data unit, and, in response to determining that the size of the aggregated data unit is larger than a target size threshold, replacing, in the manifest, the first data unit and the second data unit with the aggregated data unit.

20 Claims, 12 Drawing Sheets

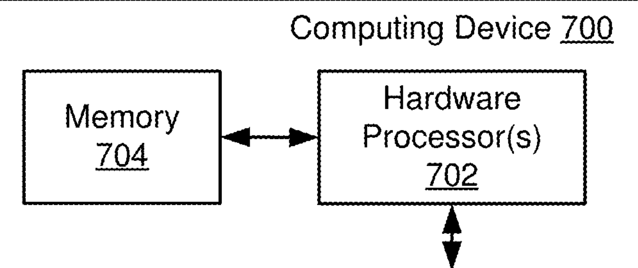

Machine Readable Storage Medium(s) 705

710

Receive a data stream to be stored in persistent storage of a deduplication storage system

720

Record, in a manifest, an arrival order of a set of data units included in the data stream

730

Determine whether an average unit size of the set of data units is smaller than a minimum size threshold

740

In response to a determination that the average unit size of the set of data units is smaller than the minimum size threshold, identify a first data unit, of the set of data units, that is smaller than the minimum size threshold

750

Generate an aggregated data unit including the first data unit and a second data unit

760

In response to a determination that a size of the aggregated data unit is larger than a target size threshold, replace, in the manifest, the first data unit and the second data unit with the aggregated data unit

FIG. 7

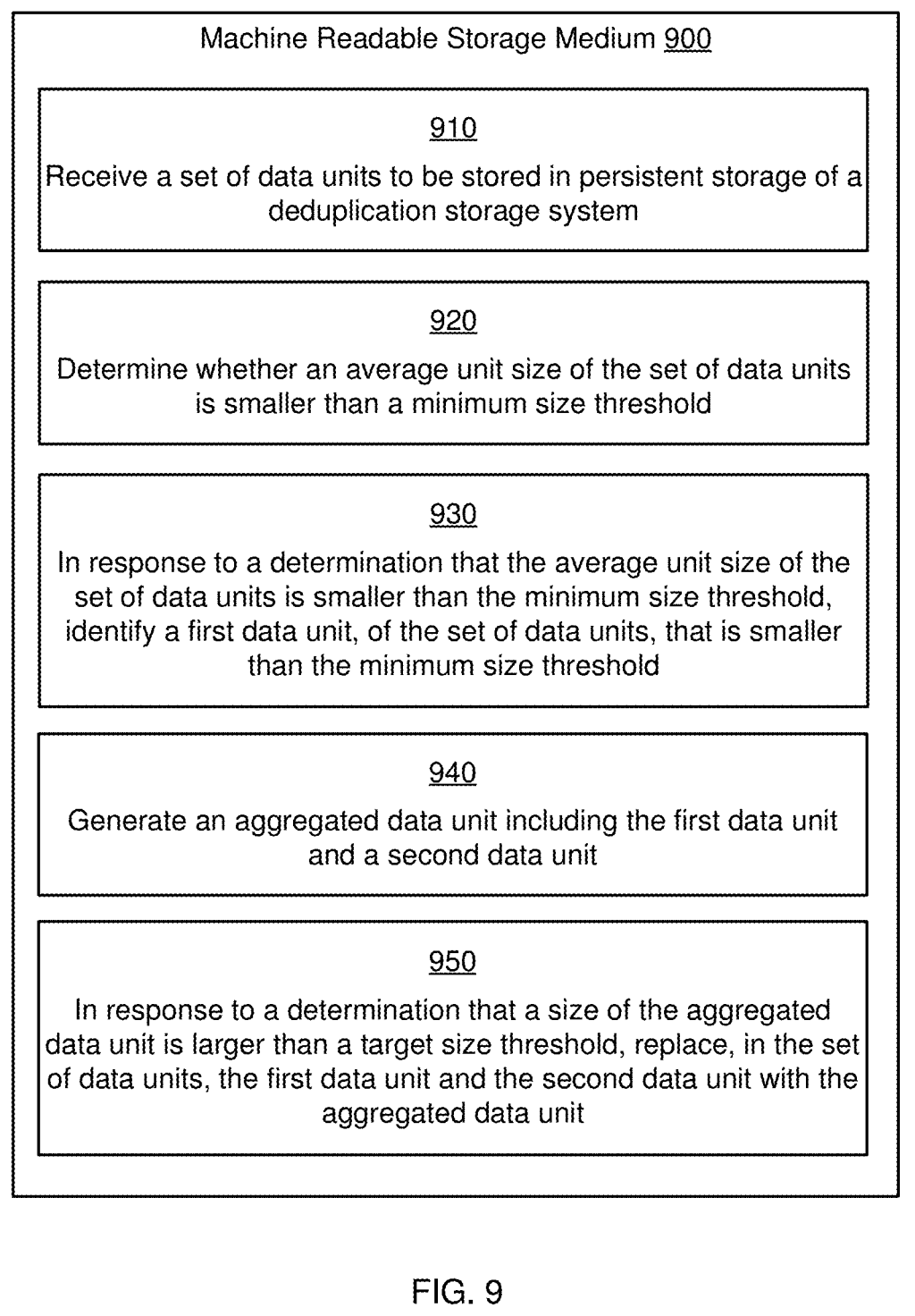

Machine Readable Storage Medium 900

910
Receive a set of data units to be stored in persistent storage of a deduplication storage system 920
Determine whether an average unit size of the set of data units is smaller than a minimum size threshold 930
In response to a determination that the average unit size of the set of data units is smaller than the minimum size threshold, identify a first data unit, of the set of data units, that is smaller than the minimum size threshold 940
Generate an aggregated data unit including the first data unit and a second data unit 950
In response to a determination that a size of the aggregated data unit is larger than a target size threshold, replace, in the set of data units, the first data unit and the second data unit with the aggregated data unit

FIG. 9

AGGREGATING DATA UNITS IN A DEDUPLICATION STORAGE SYSTEM

BACKGROUND

Data reduction techniques can be applied to reduce the amount of data stored in a storage system. An example data reduction technique includes data deduplication. Data deduplication identifies data units that are duplicative, and seeks to reduce or eliminate the number of instances of duplicative data units that are stored in the storage system.

BRIEF DESCRIPTION OF THE DRAWINGS

Some implementations are described with respect to the following figures.

FIG. 7 is a schematic diagram of an example computing device, in accordance with some implementations.

FIG. 9 is a diagram of an example machine-readable medium storing instructions in accordance with some implementations.

Figure 1A:
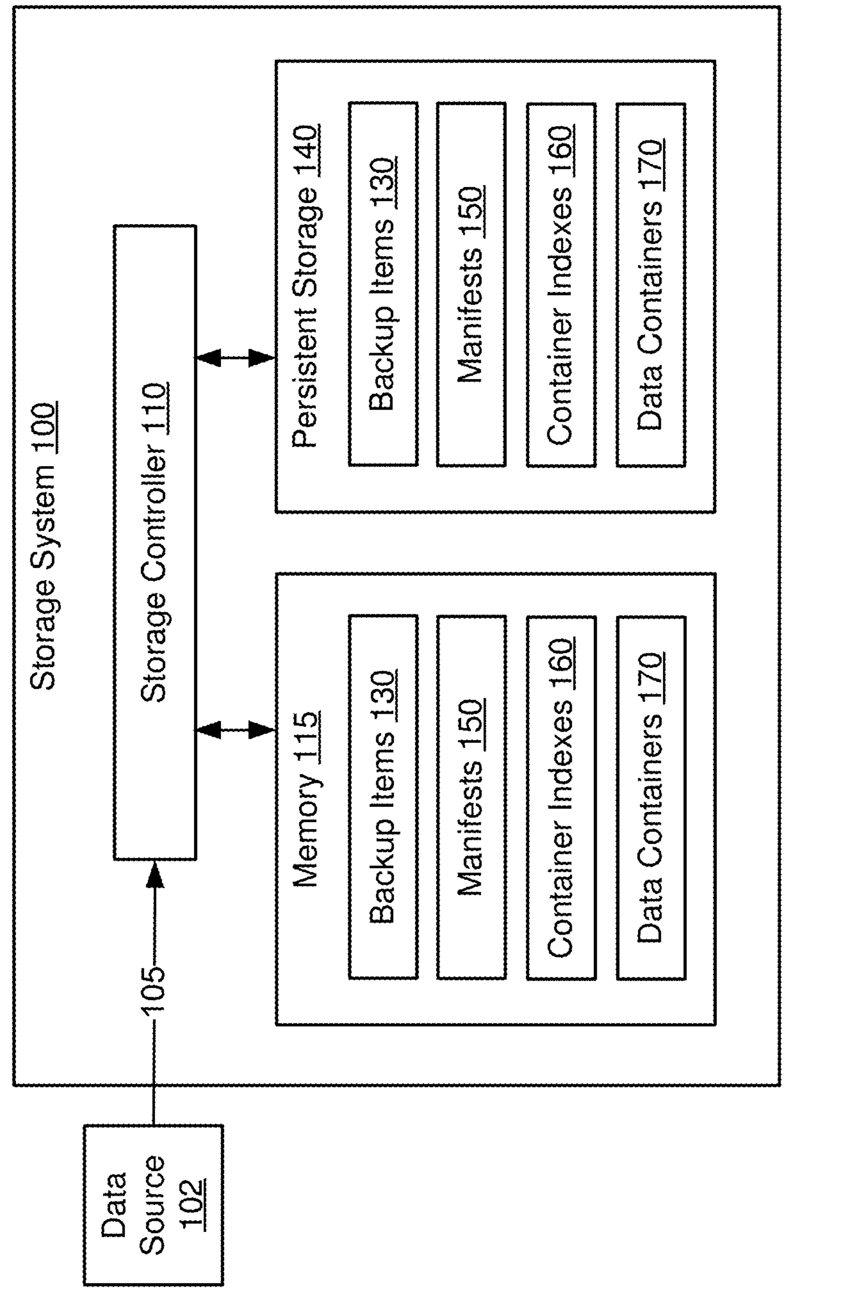
FIGS. 1A-1C are illustrations of an example storage system, in accordance with some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, a storage system may receive a data stream from an external data source or system, and may store or "backup" a copy of the data stream. For example, the data stream may be generated by a backup system or program during a backup of a collection of data. The data stream may include discrete data units (or "chunks") that are generated by the data source. Further, in some examples, the storage system may backup at least a portion of the data stream in deduplicated form, to thereby reduce the amount of storage space occupied by storage of the data stream. The storage system may create a "backup item" to represent a data stream in a deduplicated form. The storage system may perform a deduplication process including determining "fingerprints" (described below) for the incoming data units. Further, the storage system may compare the fingerprints of incoming data units to fingerprints of stored data units, and may thereby determine which incoming data units are duplicates of previously stored data units (e.g., when the comparison indicates matching fingerprints). In the case of data units that are duplicates, the storage system may store references to previously stored data units instead of storing the duplicate incoming data units.

As used herein, the term "fingerprint" refers to a value derived by applying a function on the content of the data unit (where the "content" can include the entirety or a subset of the content of the data unit). An example of a function that can be applied includes a hash function that produces a hash value based on the content of an incoming data unit. Examples of hash functions include cryptographic hash functions such as the Secure Hash Algorithm 2 (SHA-2) hash functions, e.g., SHA-224, SHA-256, SHA-384, etc. In other examples, other types of hash functions or other types of fingerprint functions may be employed.

A "storage system" can include a storage device or an array of storage devices. A storage system may also include storage controller(s) that manage(s) access of the storage device(s). A "data unit" can refer to any portion of data that can be separately identified in the storage system. In some cases, a data unit can refer to a chunk, a collection of chunks, or any other portion of data. In some examples, a storage system may store data units in persistent storage. Persistent storage can be implemented using one or more of persistent (e.g., nonvolatile) storage device(s), such as disk-based storage device(s) (e.g., hard disk drive(s) (HDDs)), solid state device(s) (SSDs) such as flash storage device(s), or the like, or a combination thereof.

A "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

In some examples, a storage system may use metadata structures for processing inbound data streams (e.g., backup items). For example, such metadata structures may include data recipes (also referred to herein as "manifests") that specify the order in which particular data units are received for each backup item. Further, such metadata structures may include item metadata to represent each received backup item (e.g., a data stream) in a deduplicated form. The item metadata may include identifiers for a set of manifests, and may indicate the sequential order of the set of manifests. The processing of each backup item may be referred to herein as a "backup process." Subsequently, in response to a read request, the storage system may use the item metadata and the set of manifests to determine the received order of data units, and may thereby recreate the original data stream of the backup item. Accordingly, the set of manifests may be a representation of the original backup item.

In some examples, the manifests may include a sequence of records, with each record representing a particular set of data unit(s). The records of the manifest may include one or more fields that identify container indexes. The container indexes may be metadata structures that index (e.g., include storage information for) the data units. For example, a container index may include multiple entries, and each entry may include one or more metadata fields that specify location information (e.g., data containers, offsets, etc.) for the stored data units, compression and/or encryption characteristics of the stored data units, and so forth. Further, the container index may include reference counts that indicate the number of manifests that reference each data unit.

In some examples, upon receiving a data unit (e.g., in a data stream), it may be matched against one or more container indexes to determine whether an identical data unit is already stored in a container of the storage system. For example, the storage system may compare the fingerprint of the received data unit against the fingerprints in one or more container indexes. As used herein, the term "matching operation" may refer to an operation to compare fingerprints of a collection of multiple data units (e.g., from a particular backup data stream) against fingerprints stored in one or more container indexes. If no matching fingerprints are found in the searched container index(es), the received data unit may be added to a data container, and a metadata entry for the received data unit may be added to a container index corresponding to that container. However, if a matching fingerprint is found in a searched container index, it may be determined that a data unit identical to the received data unit is already stored in an existing data container. In response to this determination, the reference count of the corresponding entry may be incremented, and the received data unit is not stored in a data container (as it is already present in one of the data containers), thereby avoiding storing a duplicate data unit in the storage system.

In some examples, a storage system may be configured to receive and deduplicate data units having a preferred size (or range of sizes). For example, the preferred size (also referred to as the "target size") of the storage system may correspond generally to the size of data units that are generated during a substantially continuous backup process. In some examples, receiving data units of the target size may allow the storage system to store a particular ratio (or number) of data units in deduplicated form, while using a relatively small amount of metadata to perform the deduplication of the stored data. For example, if a received data unit is substantially larger than the target size, the likelihood of finding an exact match in the stored data units may be relatively lower (e.g., in comparison to a received data unit of the target size), thereby reducing the effectiveness of attempting to deduplicate the data unit. Further, if a received data unit is smaller than the target size, the size of the unit metadata (e.g., fingerprint, reference count, location, etc.) may be substantially similar to (or larger than) the data unit itself, thereby reducing or eliminating the amount of storage space that is saved by storing the data unit in deduplicated form.

In some examples, the data source may generate a data stream including data units that are significantly smaller than the target size of the storage system. For example, if the data source is a backup process that periodically generates a small amount of data (e.g., an event log time stamp that is generated every ten seconds), the data units that are generated by the data source may be relatively smaller than the target size. In another example, if the data source is a backup process that duplicates or "clones" a portion (or portions) of stored data, the backup process may select the portion to be cloned in a manner that is not aligned with the boundaries of the stored data units in the cloned portion, and may thereby divide at least some stored data units into new data units that are relatively smaller in size. In such examples, the received data units may not be effectively deduplicated (e.g., because the size of the metadata is similar to, or is larger than, the storage space saved by deduplicating the data unit), and may therefore reduce the performance of the storage system.

In accordance with some implementations of the present disclosure, a controller of a deduplication storage system may receive a set of data units, and may record the order of the set of data units in a manifest. The controller may calculate the average unit size of the set of data units, and may compare the average unit size to a minimum size threshold (e.g., a configuration setting or parameter specifying the minimum allowed size for data units). If the average unit size is smaller than a minimum size threshold, the controller may perform an aggregation process for the set of data units. For example, the controller may iterate through the set of data units (e.g., traverse in order of arrival), and may compare the data units to the minimum size threshold. Upon identifying a first data unit that is smaller than the minimum size threshold, the controller may aggregate the first data unit with the following data unit(s) (i.e., immediately next in arrival order) to generate an aggregated data unit. As used herein, "aggregating" data units may refer to combining or appending the data units to form a single contiguous data unit.

In some implementations, the controller may determine whether the size of the aggregated data unit satisfies (e.g., is larger than or equal to) a target size threshold (e.g., a configuration setting or parameter that is equal to the target size for data units). If not, the controller may continue the aggregation process (e.g., by continuing to aggregate additional data units) until the size of the aggregated data unit satisfies the target size threshold. Once the size of the aggregated data unit satisfies the target size threshold, the controller may update the manifest to record the aggregated data unit (in place of the data units that were combined in the aggregation). Subsequently, the controller may continue the traversal through the reminder of the set of data units, and may repeat the aforementioned aggregation process for any other data units that are smaller than the minimum threshold. After completing the traversal, the controller may store the manifest and the modified set of data units in persistent storage. In this manner, the average unit size of the set of data units may be increased to correspond to the target size of the storage system. Accordingly, some implementations may allow the data units to be effectively deduplicated, and may thereby improve the performance of the storage system. The disclosed technique for aggregating data units is discussed further below with reference to FIGS. 1A-9.

Figure 1B:
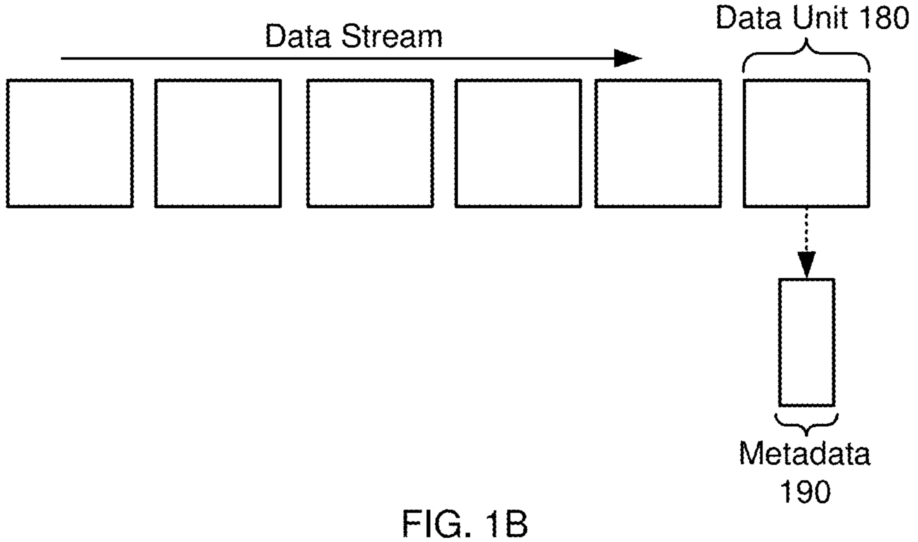
Figure 1C:
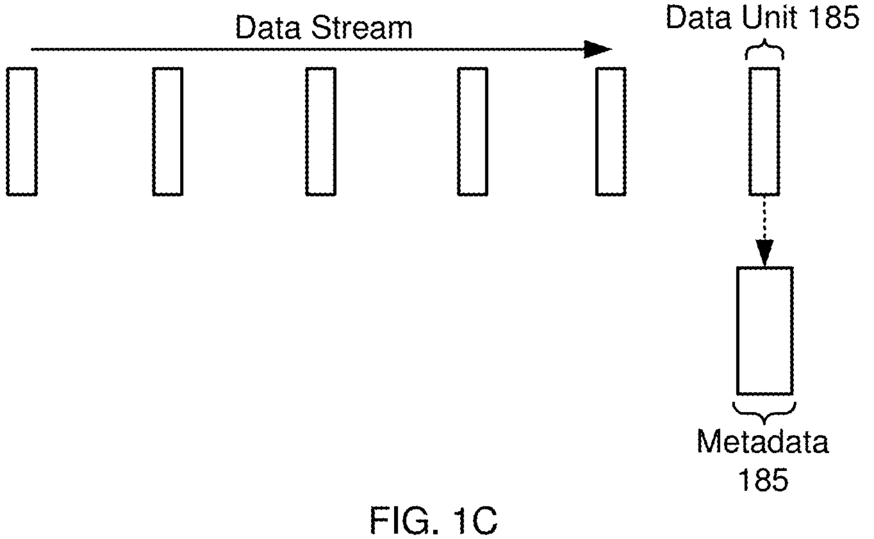

FIGS. 1A-1C—Example Storage System

FIG. 1A shows an example of a storage system 100 that includes a storage controller 110, memory 115, and persistent storage 140, in accordance with some implementations. The persistent storage 140 may include one or more non-transitory storage media such as hard disk drives (HDDs), solid state drives (SSDs), optical disks, and so forth, or a combination thereof. The memory 115 may be implemented in semiconductor memory such as random access memory (RAM). In some examples, the storage controller 110 may be implemented via hardware (e.g., electronic circuitry) or a combination of hardware and programming (e.g., comprising at least one processor and instructions executable by the at least one processor and stored on at least one machine-readable storage medium).

As shown in FIG. 1A, the memory 115 and the persistent storage 140 may store various data structures including at least backup items 130, manifests 150, container indexes 160, and data containers 170. In some examples, copies of the backup items 130, the manifests 150, the container indexes 160, and the data containers 170 may be transferred between the memory 115 and the persistent storage 140 (e.g., via read and write input/output (I/O) operations).

In some implementations, the storage system 100 may perform a data ingest operation for a data stream 105 received from a data source 102. For example, the storage controller 110 may receive an inbound data stream 105 including multiple data units, and may store at least one copy of each data unit in a data container 170 (e.g., by appending the data units to the end of the data container 170). The data source 102 may generate the data stream 105 during a backup of a collection of data. For example, the data source 102 may be a hardware device or software program that performs backups of a collection of data (e.g., at different points in time), and generates a different instance of the data stream 105 for each backup.

In some implementations, the data source 102 may generate a data stream 105 that includes data units of different sizes. For example, if the data source 102 periodically generates a small amount of data (e.g., an event log timestamp that is generated every ten seconds), the data stream 105 may include data units that are relatively smaller in size. In another example, if the data source 102 performs a cloning process in which an edge of a cloned portion is not aligned with the boundaries of the included data units, the data stream 105 may include data units that are relatively smaller in size.

In some implementations, the storage controller 110 may generate a backup item 130 to represent each received backup in a deduplicated form. Each backup item 130 may include identifiers for a set of manifests 150, and may indicate the sequential order of the set of manifests 150. The manifests 150 record the order in which the data units were received. Further, the manifests 150 may include a pointer or other information indicating the container index 160 that indexes each data unit. In some implementations, the container index 160 may indicate the location in which the data unit is stored. For example, the container index 160 may include information specifying that the data unit is stored at a particular offset in an entity, and that the entity is stored at a particular offset in a data container 170. Further, the container index 160 may include reference counts that indicate the number of manifests 150 that reference each data unit.

In some implementations, the storage controller 110 may generate a fingerprint for each received data unit. For example, the fingerprint may include a full or partial hash value based on the data unit. To determine whether an incoming data unit is a duplicate of a stored data unit, the storage controller 110 may compare the fingerprint generated for the incoming data unit to the fingerprints in at least one container index 160. The process of comparing fingerprints of one or more received data units against fingerprints of one or more container indexes 160 may be referred to herein as a "matching operation." If a match is identified in a matching operation, the storage controller 110 may determine that a duplicate of the incoming data unit is already stored by the storage system 100. The storage controller 110 may then store references to the previous data unit, instead of storing the duplicate incoming data unit. Otherwise, if no match is identified in the matching operation, the storage controller 110 may determine that the incoming data unit is a new data unit (i.e., is not already stored by the storage system 100). The storage controller 110 may then store a copy of the new data unit in a data container 170, and may index the new data unit in a container index 160.

In some implementations, the manifests 150 may include a pointer or other information indicating the container index 160 that indexes each data unit. In some implementations, the container index 160 may include a fingerprint (e.g., a hash) of a stored data unit for use in a matching process of a deduplication process. Further, the container index 160 may indicate the location in which the data unit is stored. For example, the container index 160 may include information specifying that the data unit is stored at a particular offset in an entity, and that the entity is stored at a particular offset in a data container 170. The container index 160 may also include reference counts that indicate the number of manifests 150 that reference each data unit. In some implementations, a container index 160 may record metadata for data units included in the locality portion (in data stream 105) that is allocated or associated to that container index 160.

In some implementations, prior to attempting to perform matching operations for received data units, the storage controller 110 may identify a particular container index 160 (referred to herein as the "candidate" container index) to use in matching operations for received data unit(s). In some examples, the candidate container index may be identified using a data structure (referred to herein as a "sparse index") that maps a relatively small subset of fingerprints (referred to herein as "hook points") to corresponding container indexes 160. For example, the hook points of incoming data units may be compared to the hook points in the sparse index, and the container index 160 with the highest number of matching hook points may be identified as the candidate container index. Alternatively, in some implementations, the sparse index may be used to identify a "candidate list" including multiple container indexes 160 (e.g., five container indexes 160) that have the highest numbers of matching hook points. In such implementations, the candidate list may be used in matching operations for received data unit(s). In some implementations, the sparse index may contain entries for a subset of fingerprints defined by a sparse fingerprint condition. As used herein, the term "hook points" refers to the subset of fingerprints that meet the sparse fingerprint condition. In some examples, the sparse fingerprint condition may be a condition that is met by a relatively small number of all of the possible fingerprints. For example, the sparse fingerprint condition may be whether a given fingerprint (e.g., in a binary representation) includes a particular bit pattern at a particular offset.

In some implementations, the storage controller 110 may receive a read request to access the stored data, and in response may access metadata (e.g., backup item 130 and manifest(s) 150) to determine the sequence of data units that made up the original data. The storage controller 110 may then use pointer data included in a manifest 150 to identify the container indexes 160 that index the data units. Further, the storage controller 110 may use information included in the identified container indexes 160 (and information included in the manifest 150) to determine the locations that store the data units (e.g., data container 170, entity, offsets, etc.), and may then read the data units from the determined locations.

In some implementations, the storage system 100 may be configured to receive and store data units of a target size. In some examples, receiving data units of the target size may allow the storage controller 110 to store a particular ratio of data units in deduplicated form, while using a relatively small amount of metadata to perform the deduplication of the stored data. However, if a received data unit is smaller than the target size, the size of metadata may not be substantially smaller than the storage space saved by deduplicating the data unit, and therefore the data unit may not be effectively deduplicated in the storage system 100. For example, as shown in FIG. 1B, a data stream may include a data unit 180 that is relatively larger than the metadata 190 that represents the data unit 180, thereby allowing efficient deduplication of the data unit 180. In contrast, as shown in FIG. 1C, a data unit 185 may be relatively smaller than the metadata 190 that represents the data unit 185, thereby preventing efficient deduplication of the data unit 185.

Referring again to FIG. 1A, the storage controller 110 may receive a data stream 105 including a set of data units, and may calculate the average unit size of the set of data units. If the average unit size is smaller than a minimum threshold, the storage controller 110 may perform an aggregation process for the set of data units. For example, the storage controller 110 may traverse through the set of data units (e.g., in order of arrival), and may compare the size of each data unit to the minimum threshold. Upon identifying a first data unit that is smaller than the minimum threshold, the storage controller 110 may aggregate the first data unit with the following data unit to generate an aggregated data unit. Further, if the aggregated data unit is smaller than a target threshold, the storage controller 110 may aggregate the aggregated data unit with the following data unit(s) to generate another aggregated data unit. The aggregation of data unit(s) may continue until the aggregated data unit is no longer smaller than the target threshold. Subsequently, the storage controller 110 may continue the traversal through the reminder of the set of data units, and may repeat the aggregation process for any other data units that are smaller than the minimum threshold.

After completing the traversal, the storage controller 110 may store the updated set of data units (i.e., the aggregated data unit(s) and any remaining original data units) in a persistent storage (e.g., in one or more data containers 170 shown in FIG. 1A). Further, the storage controller 110 may store the updated manifest (i.e., recording the order of the updated set of data units) in the persistent storage (e.g., as a manifest 150 shown in FIG. 1A). In some implementations, the storage controller 110 may also generate fingerprints for the updated set of data units, and may store the fingerprints in persistent storage (e.g., in one or more container indexes 160 shown in FIG. 1A). Furthermore, the storage controller 110 may perform deduplication of the set of data units using the generated fingerprints and the updated manifest. In this manner, the storage controller 110 may increase the average unit size of the set of data units to be equal to (or exceed) the target size of the storage system 100, and may thereby improve the performance of the storage system. An example process for aggregating data units is discussed further below with reference to FIGS. 3-4G.

In some implementations, the minimum threshold and the target threshold may be configuration parameters or settings of the storage system 100. These thresholds may be specified (e.g., by a human administrator) or automatically calculated to provide desired levels of (or desired balances between) performance characteristics associated with aggregating the data unis. For example, these thresholds may be configured to allow a desired number or portion of aggregated data units to be stored in deduplicated form, while using a relatively small amount of metadata to perform the deduplication of the aggregated data units. Further, these thresholds may also be configured so that the aggregated data units are not so large that the likelihood of finding an exact match during deduplication of the data units is significantly reduced. Furthermore, these thresholds may also be configured so that the processing overhead needed to aggregate the data units is not so large that is offsets the benefit(s) provided by the aggregated data units. In some implementations, the minimum threshold and the target threshold may be determined or calculated based at least in part on other parameters or metrics of the storage system 100 (e.g., deduplication ratio, available capacity, etc.) and/or the data source 102 (e.g., refresh rate, chunk size, etc.). Other combinations or examples are possible.

Figure 2:
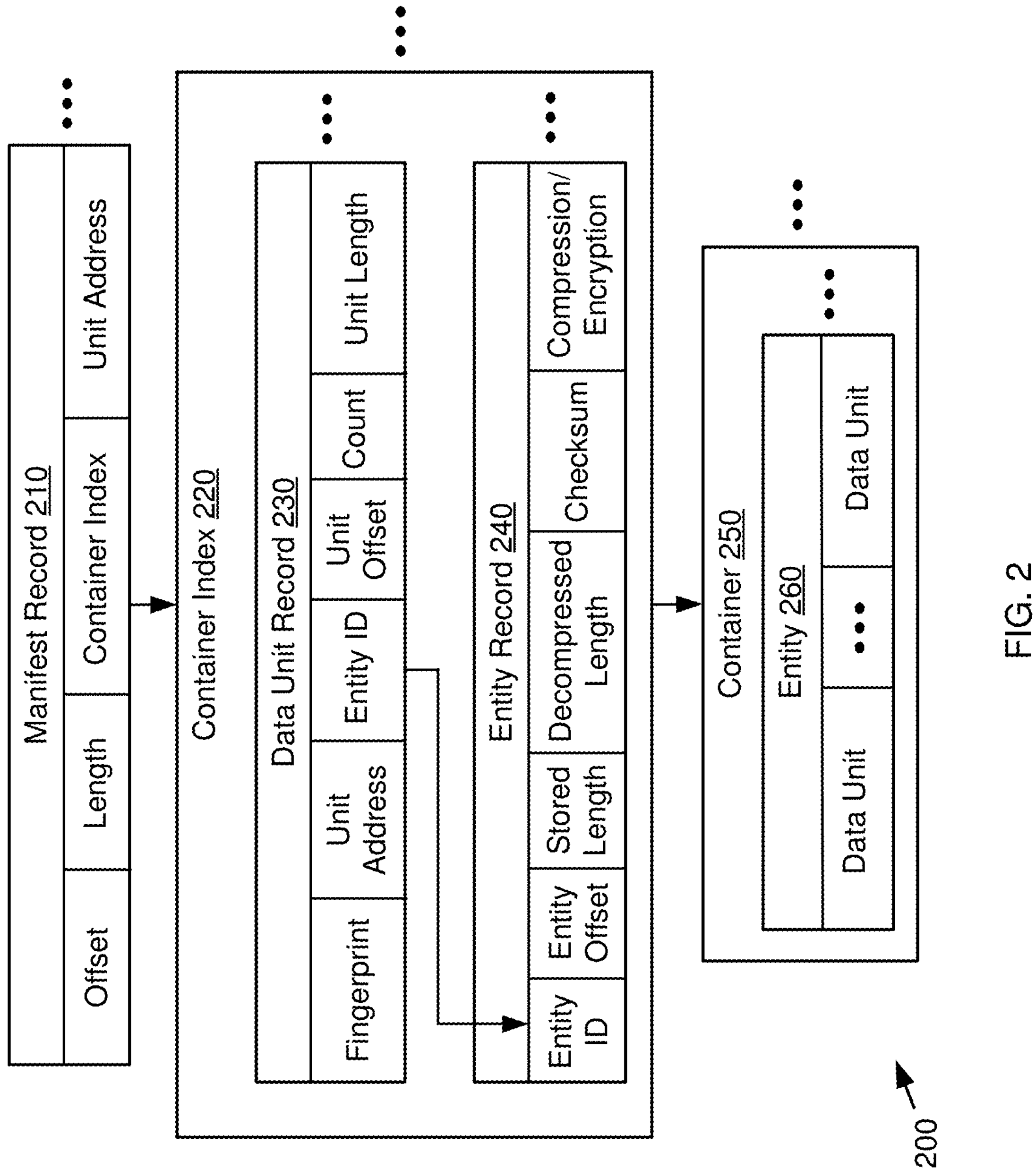
FIG. 2 is an illustration of example data structures, in accordance with some implementations.

FIG. 2—Example Data Structures

FIG. 2 shows example data structures 200 used in deduplication, in accordance with some implementations. As shown, the data structures 200 may include item metadata 202, a manifest 203, a container index 220, and a data container 250. In some examples, the item metadata 202, the manifest 203, the container index 220, and the data container 250 may correspond generally to example implementations of a backup item 130, a manifest 150, a container index 160, and a data container 170 (shown in FIGS. 1A), respectively. In some examples, the data structures 200 may be generated and/or managed by the storage controller 110 (shown in FIG. 1).

In some implementations, the item metadata 202 may include multiple manifests identifiers 205. Each manifests identifier 205 may identify a different manifest 203. In some implementations, the manifests identifiers 205 may be arranged in a stream order (i.e., based on the order of receipt of the data units represented by the identified manifests 203).

Although one of each is shown for simplicity of illustration in FIG. 2, data structures 200 may include a plurality of instances of item metadata 202, each including or pointing to one or more manifests 203. In such examples, data structures 200 may include a plurality of manifests 203. The manifests 203 may reference a plurality of container indexes 220, each corresponding to one of a plurality of data containers 250. Each container index 220 may comprise one or a plurality of data unit records 230, and one or a plurality of entity records 240.

As shown in FIG. 2, in some examples, each manifest 203 may include one or more manifest records 210. Each manifest record 210 may include various fields, such as offset, length, container index, and unit address. In some implementations, each container index 220 may include any number of data unit record(s) 230 and entity record(s) 240. Each data unit record 230 may include various fields, such as a fingerprint (e.g., a hash of the data unit), a unit address, an entity identifier, a unit offset (i.e., an offset of the data unit within the entity), a reference count value, a unit length, and an arrival time. The reference count value may indicate the number of manifest records 210 that reference the data unit record 230. In some implementations, the arrival time (e.g., stored in the data unit record 230) may record the data and time that the data unit is received by the storage system. In other implementations, the arrival time may indicate the data and time that the data unit record 230 was created to record information regarding the received data unit.

In some implementations, each entity record 240 may include various fields, such as an entity identifier, an entity offset (i.e., an offset of the entity within the container), a stored length (i.e., a length of the data unit within the entity), a decompressed length, a checksum value, and compression/encryption information (e.g., type of compression, type of encryption, and so forth). In some implementations, each container 250 may include any number of entities 260, and each entity 260 may include any number of stored data units.

In one or more implementations, the data structures 200 may be used to retrieve stored deduplicated data. For example, a read request may specify an offset and length of data in a given file. These request parameters may be matched to the offset and length fields of a particular manifest record 210. The container index and unit address of the particular manifest record 210 may then be matched to a particular data unit record 230 included in a container index 220. Further, the entity identifier of the particular data unit record 230 may be matched to the entity identifier of a particular entity record 240. Furthermore, one or more other fields of the particular entity record 240 (e.g., the entity offset, the stored length, checksum, etc.) may be used to identify the container 250 and entity 260, and the data unit may then be read from the identified container 250 and entity 260.

Figure 3:
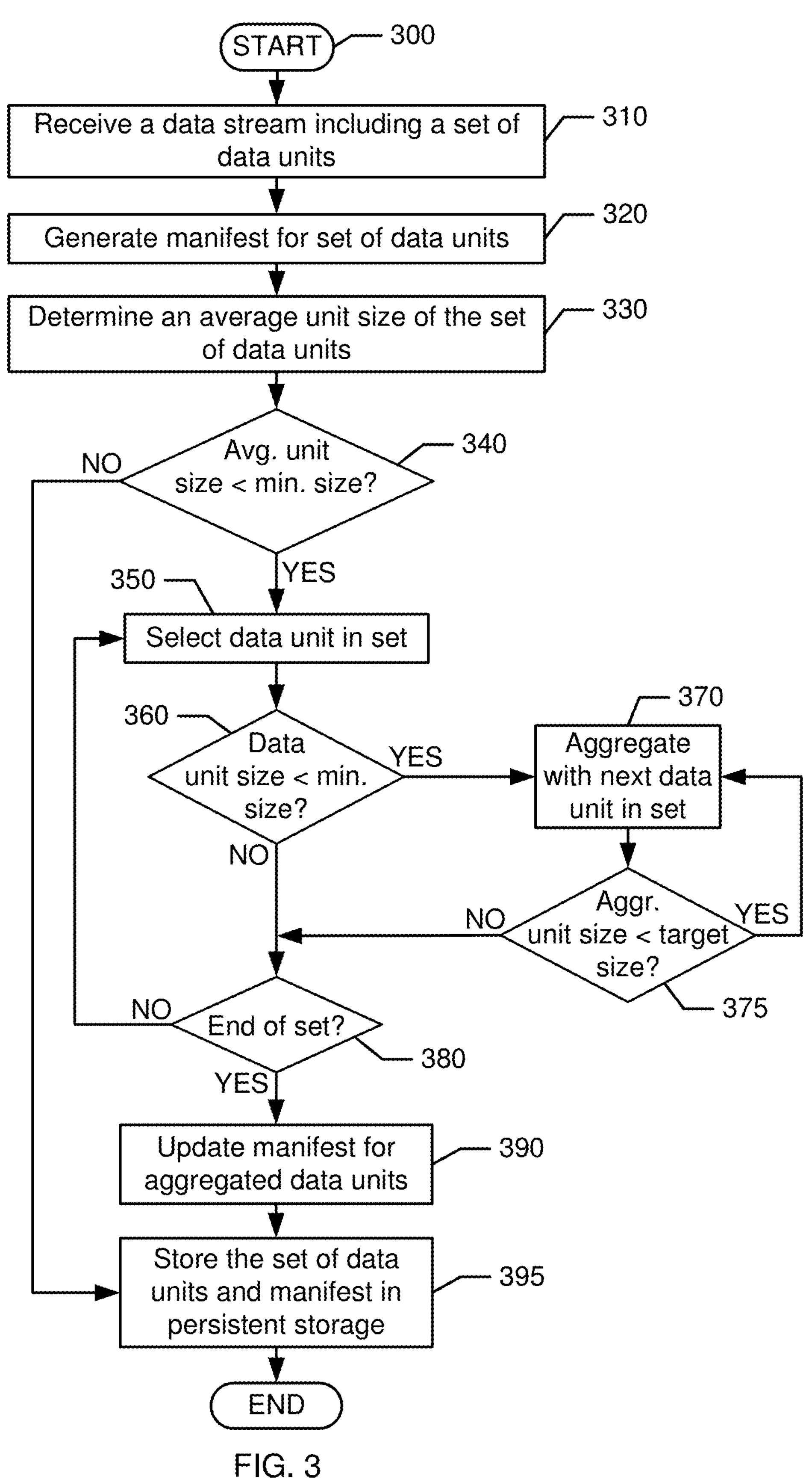
FIG. 3 is an illustration of an example process, in accordance with some implementations.
Figure 4A:
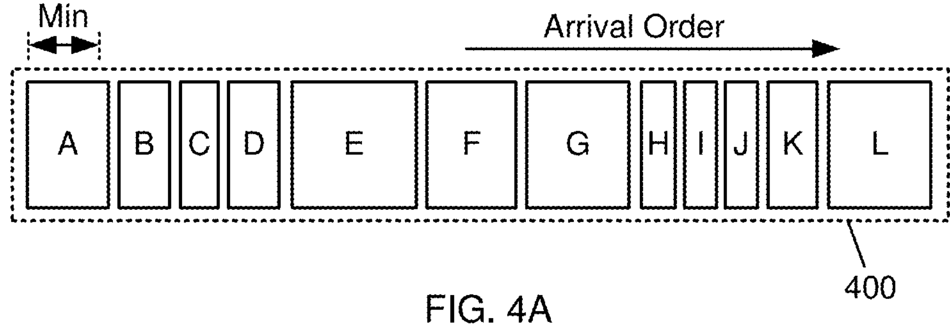
FIGS. 4A-4G are illustrations of example operations, in accordance with some implementations.
Figure 4B:
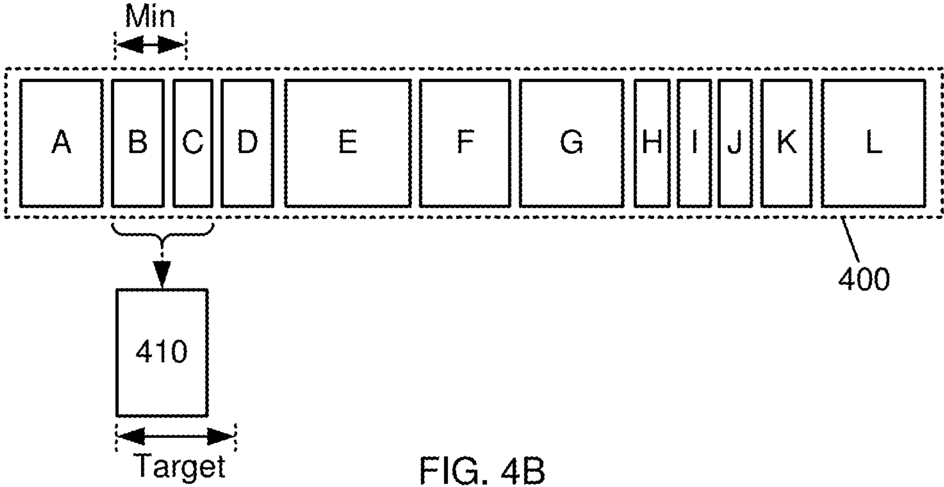
Figure 4C:
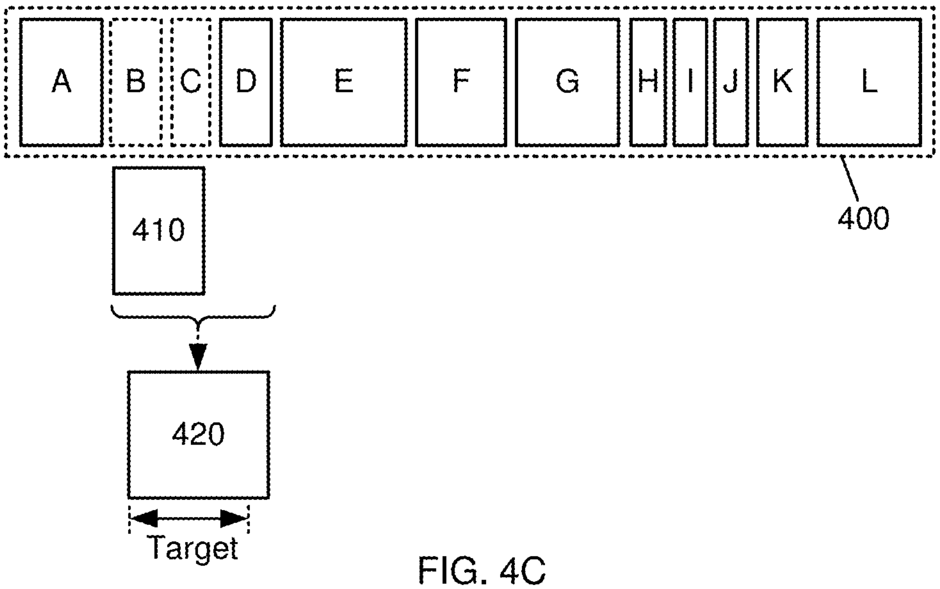
Figure 4D:
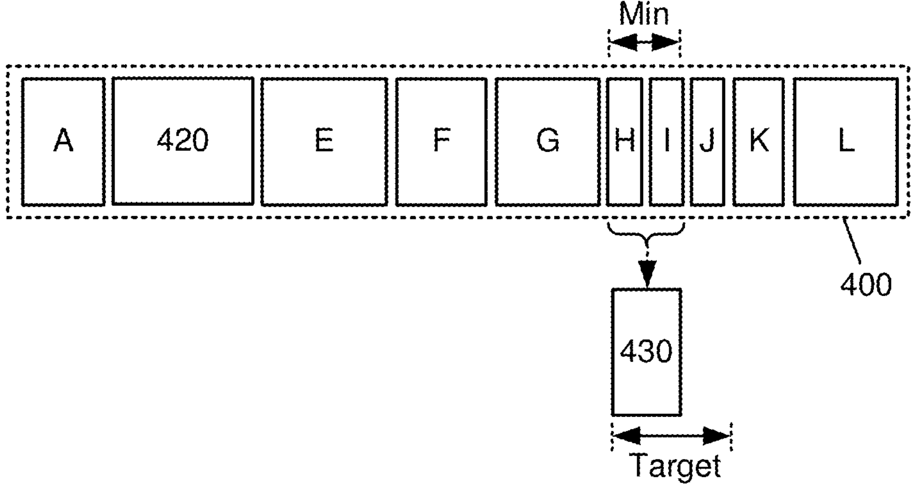
Figure 4E:
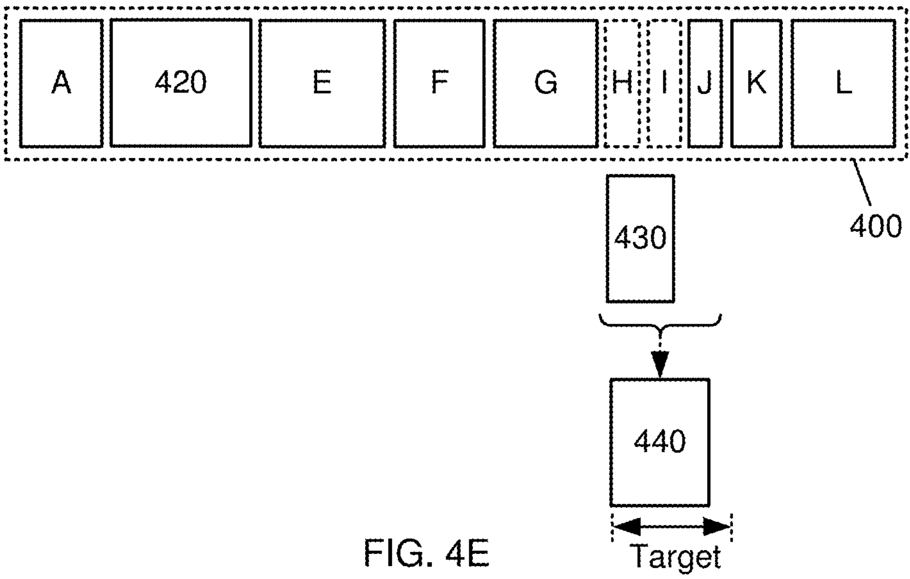
Figure 4F:
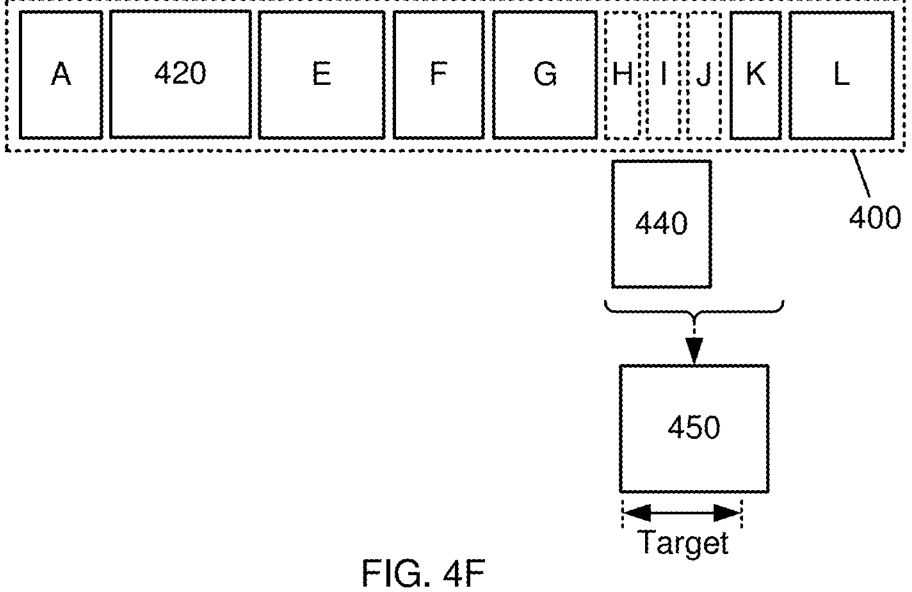
Figure 4G:
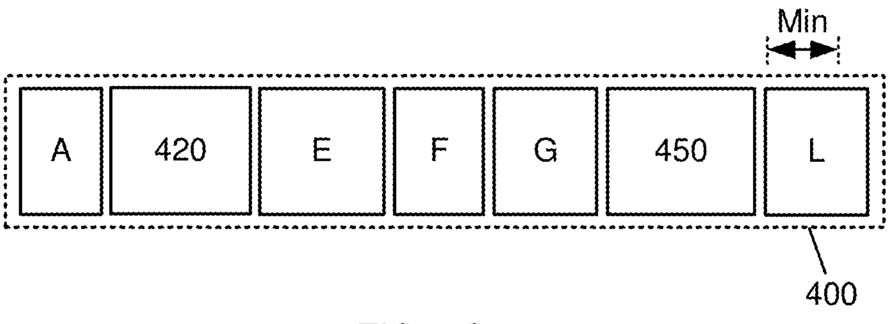
Figure 5:
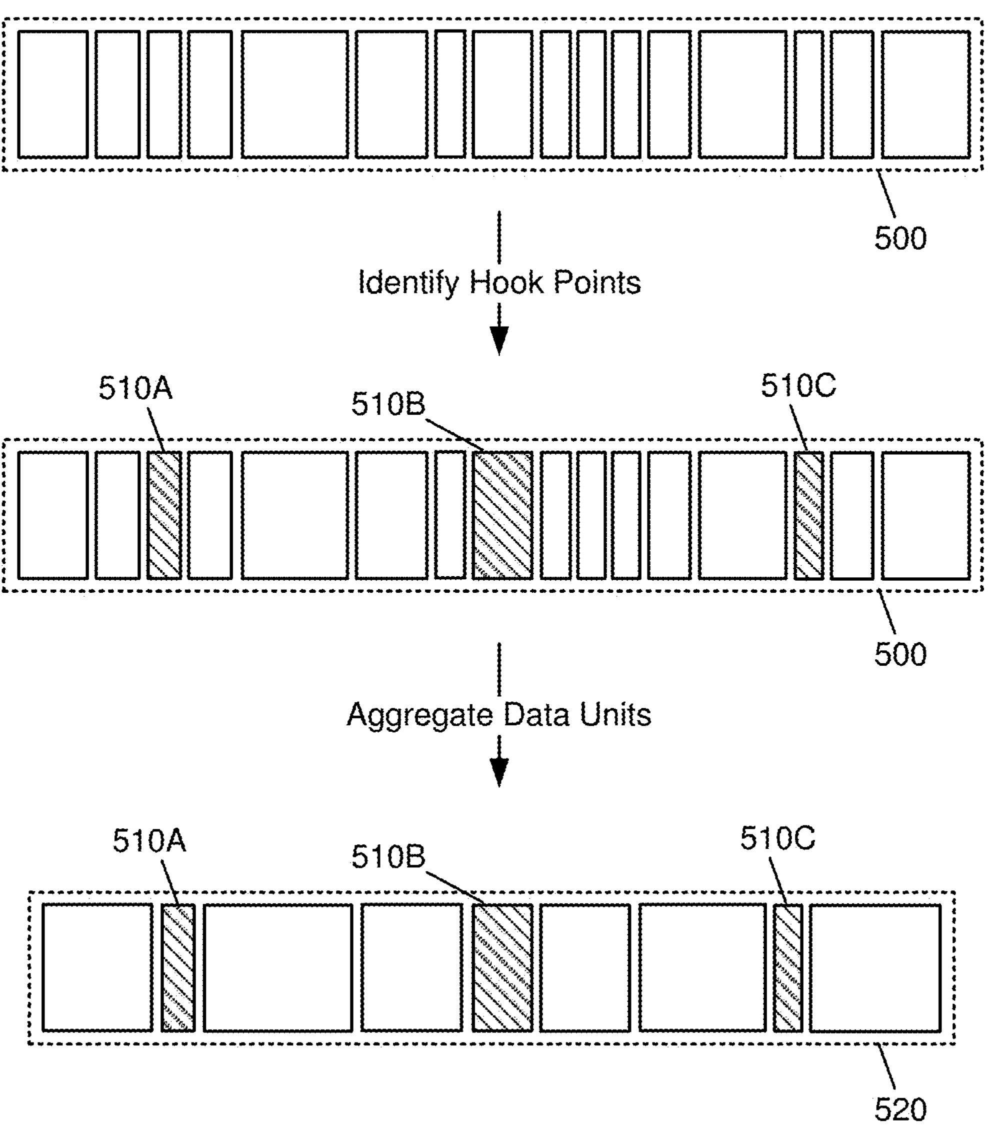
FIG. 5 is an illustration of an example operation, in accordance with some implementations.

FIGS. 3-5—Example Process for Aggregating Data Units

FIG. 3 shows an example process 300 for aggregating data units, in accordance with some implementations. For the sake of illustration, details of the process 300 may be described below with reference to FIGS. 4A-4G, which show examples in accordance with some implementations. However, other implementations are also possible. In some examples, the process 300 may be performed using the storage controller 110 (shown in FIG. 1A). The process 300 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

As shown in FIG. 3, block 310 may include receiving a data stream including a set of data units. Block 320 may include generating a manifest to record the order of the set of data units. Block 330 may include determining an average unit size for the set of data units. Decision block 340 may include determining whether the average unit size for the set of data units is smaller than a minimum size threshold.

For example, referring to FIG. 4A, at a first point in time, a controller (e.g., storage controller 110 shown in FIG. 1A) receives a set 400 of multiple data units (labelled "A" to "L") to be stored in persistent storage. Note that, in the example shown in FIG. 4A, the size of each data unit is represented by the horizontal width of that data unit. The controller generates a manifest (e.g., manifest 150 shown in FIG. 1A) to record the arrival order of the data units A-L (i.e., in order of receipt at the storage system 100). The controller calculates the average size of the data units A-L in the set 400 (e.g., by summing the sizes of data units A-L, and then dividing by the number of data units A-L). Further, the controller determines whether the average size is smaller than a minimum size threshold ("Min"). In some implementations, the minimum size threshold may be a setting or parameter specifying the minimum allowed size for data units to be stored in persistent storage.

Referring again to FIG. 3, if it is determined at decision block 340 that the average unit size for the set of data units is smaller than the minimum size threshold ("YES"), the process 300 may continue at block 350, including selecting a data unit in the set (e.g., the first data unit in the arrival order of the set). Decision block 360 may include determining whether the size of the selected data unit is smaller than the minimum size threshold. If not ("NO"), the process 300 may continue at decision block 380, including determining whether the end of the set of data units has been reached (i.e., there are no more data units that follow the selected data unit in the arrival order of the set). If the end of the set has not been reached ("NO"), the process 300 may return to block 350 (i.e., to select the next data unit in the arrival order of the set).

For example, referring to FIG. 4A, the controller determines that the average size of the data units A-L in the set 400 is smaller than the minimum size threshold, and in response performs a traversal of the set 400 in arrival order (e.g., as recorded in the manifest). When initiating the traversal of the set 400, the controller selects the first data unit A (i.e., the earliest data unit in arrival order), and determines that the size of data unit A is larger than the minimum size threshold (as shown in FIG. 4A). In response to this determination, the controller continues the traversal of the set 400 by selecting data unit B.

Referring again to FIG. 3, if it is determined at decision block 360 that the size of the selected data unit is smaller than the minimum size threshold ("YES"), then the process 300 may continue at block 370, including aggregating the selected data unit with the next data unit (i.e., the data unit that consecutively follows the selected data unit) in the set of data units. After block 370, the process 300 may continue at decision block 375, including determining whether the size of the aggregated data unit is smaller than a target size threshold. Upon a positive determination ("YES"), the process 300 may return to block 370 (i.e., to aggregate the next data unit into the aggregated data unit). Otherwise, if it determined at decision block 375 that the size of the aggregated data unit is not smaller than (i.e., is larger than or equal to) the target size threshold ("NO"), then the process 300 may continue at decision block 380. If it is determined at decision block 380 that the end of the set of data units has not been reached ("NO"), the process 300 may return to block 350 (i.e., to select the next data unit in the arrival order of the set). Otherwise, if it is determined at decision block 380 that the end of the set of data units has been reached ("YES"), the process 300 may continue at block 390, including updating the manifest to record the aggregated data unit(s) in the set (i.e., in place of the data units that were combined in the aggregation). Block 395 may include storing the set of data units and the manifest in persistent storage. After block 395, the process 300 may be completed.

For example, referring to FIG. 4B, at a second point in time, the controller determines that the size of data unit B is smaller than the minimum size threshold ("Min"). In response to this determination, the controller aggregates data unit B with the next data unit C (i.e., the next data unit in the arrival order of the set 400), thereby generating a first aggregated data unit 410. Further, the controller determines that the size of the first aggregated data unit 410 is smaller than the target size threshold ("Target"). In response to this determination, as shown in FIG. 4C, at a third point in time, the controller aggregates the next data unit D with the first aggregated data unit 410, thereby generating the second aggregated data unit 420. The controller then determines that the size of the second aggregated data unit 420 is larger than the target size threshold ("Target"). In response to this determination, the controller replaces, in the order recorded in the manifest, the data units B, C, D with the second aggregated data unit 420. Subsequently, the controller continues the traversal of the set 400 by selecting the next data unit E.

Referring now to FIG. 4D, at a fourth point in time, the controller has determined that the sizes of data units E, F, and G are all larger than the minimum size threshold, and therefore these data units are not aggregated. Accordingly, the controller selects the next data unit H, and determines that the size of data unit H is smaller than the minimum size threshold. In response to this determination, the controller aggregates data unit H with the next data unit I, thereby generating a third aggregated data unit 430. Further, the controller determines that the size of the third aggregated data unit 430 is smaller than the target size threshold. In response to this determination, as shown in FIG. 4E, at a fifth point in time, the controller aggregates the next data unit J with the third aggregated data unit 430, thereby generating the fourth aggregated data unit 440. The controller then determines that the size of the fourth aggregated data unit 440 is smaller than the target size threshold. In response to this determination, as shown in FIG. 4F, at a sixth point in time, the controller aggregates the next data unit K with the fourth aggregated data unit 440, thereby generating the fifth aggregated data unit 450. The controller then determines that the size of the fifth aggregated data unit 450 is larger than the target size threshold. In response to this determination, the controller replaces, in the order recorded in the manifest, the data units I, J, K with the fifth aggregated data unit 450. Subsequently, the controller continues the traversal of the set 400 by selecting the next data unit L.

Referring now to FIG. 4G, at a seventh point in time, the controller determines that the size of data unit L is larger than the minimum size threshold, and therefore is not aggregated. Further, the controller determines that data unit L is the last data unit in the set 400, and thus completes the traversal of the set 400. The controller may then store the updated set of data units (i.e., including data unit A, aggregated data unit 420, data unit E, data unit F, data unit G, aggregated data unit 450, and data unit L) in a persistent storage (e.g., in one or more data containers 170 shown in FIG. 1A). Further, the controller may store the updated manifest (i.e., recording the order of the updated set of data units) in the persistent storage (e.g., as a manifest 150 shown in FIG. 1A). In some implementations, the controller may also generate fingerprints for the updated set of data units, and may store the fingerprints in persistent storage (e.g., in one or more container indexes 160 shown in FIG. 1A). Furthermore, the controller may perform deduplication of the set of data units using the generated fingerprints and the updated manifest.

In some implementations, a received data stream may include a set of hook points (e.g., a set of fingerprints) that are compared to a sparse index to identify candidate container indexes that are matched against received data units. In such implementations, an aggregation process may exclude data units that are identified as hook points in a data stream. For example, referring now to FIG. 5, a controller may receive a data segment 500, and may identify a subset of data units 510A-510C with fingerprints that are hook points. The controller may then perform an aggregation process (e.g., process 300 shown in FIG. 3) that excludes the data units 510A-510C with hook points. Accordingly, as shown in FIG. 5, the aggregated data segment 520 may include the data units 510A-510C in their original (non-aggregated) form. In this manner, the hook points in the data units 510A-510C may be used to identify candidate container index(es) for matching against the aggregated data segment 520.

In some implementations, the data units 510A-510C may be identified by determining that their fingerprints satisfy a sparse fingerprint condition (i.e., a condition that is met by a relatively small number of all of the possible fingerprints of data units). The sparse fingerprint condition may be whether a given fingerprint (e.g., in a binary representation) includes a particular bit pattern at a particular offset. For example, the sparse fingerprint condition may be met by each fingerprint having five zeroes ("00000") in a row starting at a given bit position (or offset) of the fingerprint (e.g., starting at the fifth bit position). In another example, the sparse fingerprint condition may be selected such that the hook points may have a desirable statistical distribution over the universe of the possible fingerprints. In still other examples, a sparse fingerprint condition may be specified based on an offset or distance between hook points (e.g., 10 data units), as an amount of data between hook points (e.g., 10 MB), as a beginning or an end of the segment, and so forth. Other suitable sparse fingerprint conditions may be used.

Note that, while FIG. 3 illustrates one example implementation of an aggregation process, other implementations are possible. For example, regarding decision block 340, it is contemplated that the positive determination may be reached if the average unit size for the set of data units is smaller than or equal to the minimum size threshold. Further, regarding decision block 360, it is contemplated that the positive determination may be reached if the size of the selected data unit is smaller than or equal to the minimum size threshold. Furthermore, regarding decision block 375, it is contemplated that the positive determination may be reached if the size of the aggregated data unit is smaller than or equal to the target size threshold.

Figure 6:
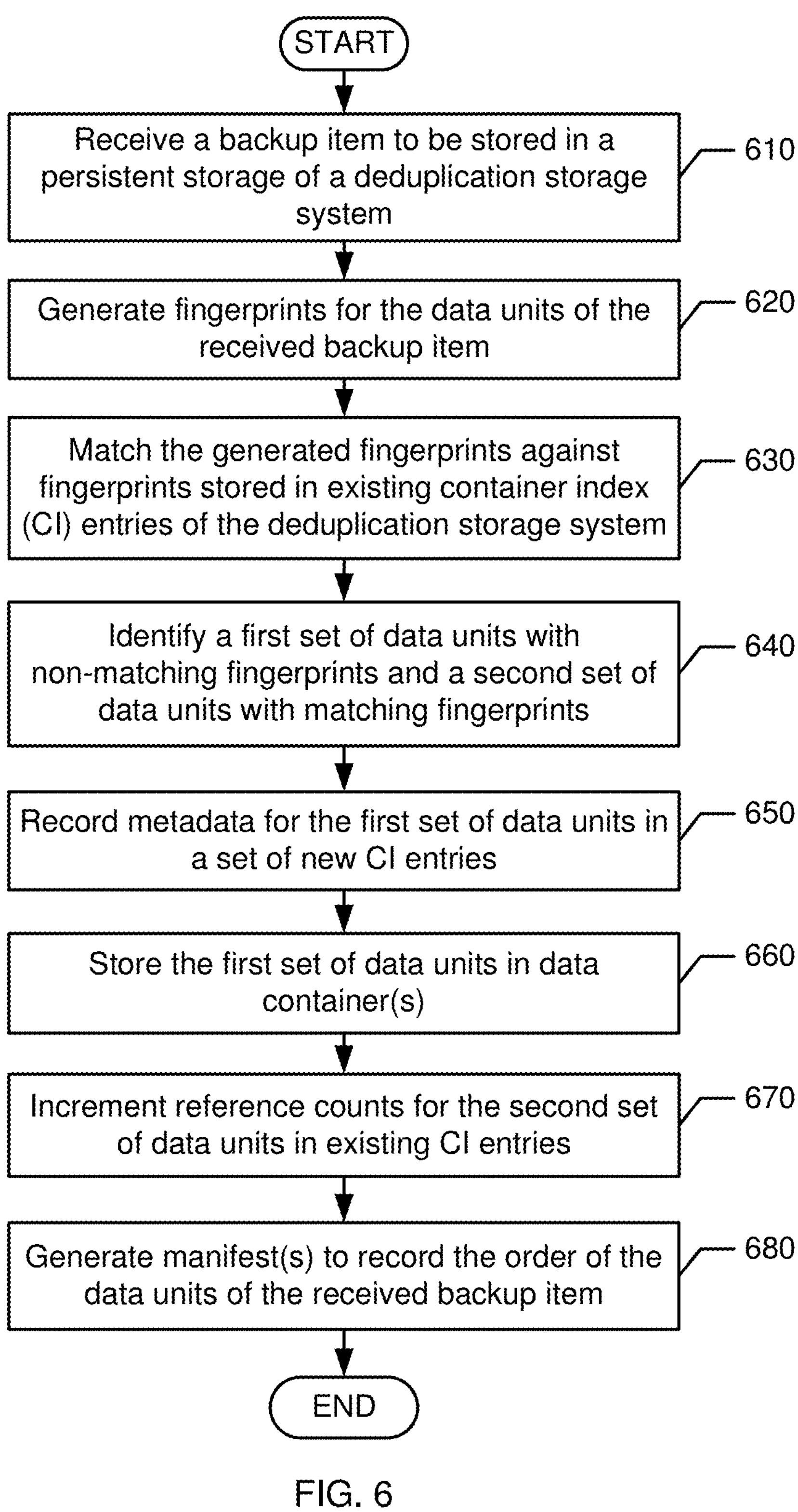
FIG. 6 is an illustration of an example process, in accordance with some implementations.

FIG. 6—Example Process for Generating Metadata

FIG. 6 shows an example process 600 for generating metadata, in accordance with some implementations. For the sake of illustration, details of the process 600 may be described below with reference to FIGS. 1A-2, which show examples in accordance with some implementations. However, other implementations are also possible. In some examples, the process 600 may be performed using the storage controller 110 (shown in FIG. 1A). The process 600 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Block 610 may include receiving a backup item to be stored in a persistent storage of a deduplication storage system. Block 620 may include generating fingerprints for the data units of the received backup item. Block 630 may include matching the generated fingerprints against fingerprints stored in existing container index (CI) entries of the deduplication storage system. Block 640 may include identifying a first set of data units with non-matching fingerprints and a second set of data units with matching fingerprints.

Block 650 may include recording metadata for the first set of data units in a set of new CI entries. Block 660 may include storing the first set of data units in one or more data containers. Block 670 may include incrementing reference counts for the second set of data units in existing CI entries. Block 680 may include generating one or more manifests to record the order of the data units of the received backup item.

For example, referring to FIG. 1A, the storage controller 110 receives a backup item (e.g., data stream 105) to be stored in the deduplication storage system 100, and generates fingerprints for the data units in the received backup item. The storage controller 110 compares the generated fingerprints to the fingerprints included in container indexes 160. If a match is identified for a data unit, then the storage controller 110 determines that a duplicate of the data unit is already stored by the storage system 100. In response to this determination, the storage controller 110 stores a reference to the previous data unit (e.g., in a manifest 150) in deduplicated form. Otherwise, if a match is not identified for a data unit, then the storage controller 110 stores the data unit in a data container 170, and adds an entry for the data unit to a container index 160 corresponding to that data container 170. In some implementations, the storage controller 110 records the order in which data units are received in one or more manifests 150.

FIG. 7—Example Computing Device

FIG. 7 shows a schematic diagram of an example computing device 700. In some examples, the computing device 700 may correspond generally to some or all of the storage system 100 (shown in FIG. 1A). As shown, the computing device 700 may include a hardware processor 702, a memory 704, and machine-readable storage 705 including instructions 710-750. The machine-readable storage 705 may be a non-transitory medium. The instructions 710-750 may be executed by the hardware processor 702, or by a processing engine included in hardware processor 702.

Instruction 710 may be executed to receive a data stream to be stored in persistent storage of a deduplication storage system, where the data stream comprises a plurality of locality portions each comprising a plurality of data units. Instruction 720 may be executed to record, in a manifest, an arrival order of a set of data units included in the data stream. Instruction 730 may be executed to determine whether an average unit size of the set of data units is smaller than a minimum size threshold.

Instruction 740 may be executed to, in response to a determination that the average unit size of the set of data units is smaller than the minimum size threshold, identify a first data unit, of the set of data units, that is smaller than the minimum size threshold. Instruction 750 may be executed to generate an aggregated data unit including the first data unit and a second data unit. Instruction 760 may be executed to, in response to a determination that a size of the aggregated data unit is larger than a target size threshold, replace, in the manifest, the first data unit and the second data unit with the aggregated data unit.

For example, referring to FIG. 4A, a controller receives a set 400 of multiple data units A-L to be stored in persistent storage. The controller generates a manifest to record the arrival order of the data units A-L in the set 400. Further, the controller determines that the average size of data units A-L is smaller than a minimum size threshold ("Min"), and in response performs a traversal of the data units A-L. During the traversal, the controller selects the first data unit A in the set, and determines that the size of data unit A is larger than the minimum size threshold. In response to this determination, the controller selects the next data unit B.

Referring now to FIG. 4B, the controller determines that the size of data unit B is smaller than the minimum size threshold. and then determines that the size of data unit B is smaller than the minimum size threshold. In response to this determination, the controller aggregates data unit B with the next data unit C, thereby generating a first aggregated data unit 410. Further, the controller determines that the size of the first aggregated data unit 410 is smaller than the target size threshold ("Target").

In response to this determination, as shown in FIG. 4C, the controller aggregates the next data unit D with the first aggregated data unit 410, thereby generating the second aggregated data unit 420. The controller then determines that the size of the second aggregated data unit 420 is larger than the target size threshold ("Target"). In response to this determination, the controller replaces, in the order recorded in the manifest, the data units B, C, D with the second aggregated data unit 420.

Figure 8:
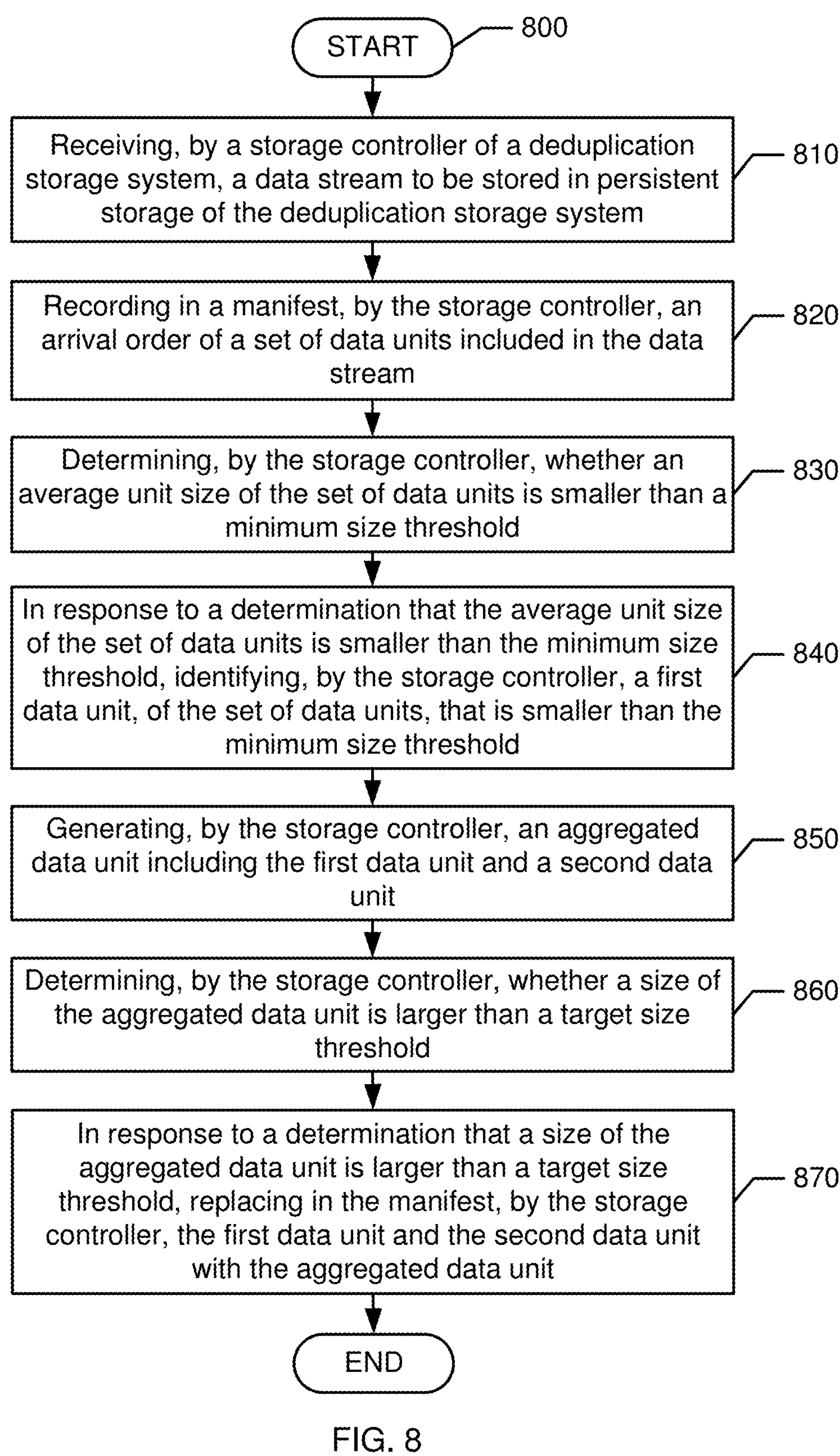
FIG. 8 is an illustration of an example process, in accordance with some implementations.

FIG. 8—Example Process for Aggregating Data Units

FIG. 8 shows an example process 800 for aggregating data units, in accordance with some implementations. In some examples, the process 800 may be performed using the storage controller 110 (shown in FIG. 1A). The process 800 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Block 810 may include receiving, by a storage controller of a deduplication storage system, a data stream to be stored in persistent storage of the deduplication storage system. Block 820 may include recording in a manifest, by the storage controller, an arrival order of a set of data units included in the data stream. Block 830 may include determining, by the storage controller, whether an average unit size of the set of data units is smaller than a minimum size threshold.

Block 840 may include, in response to a determination that the average unit size of the set of data units is smaller than the minimum size threshold, identifying, by the storage controller, a first data unit, of the set of data units, that is smaller than the minimum size threshold. Block 850 may include generating, by the storage controller, an aggregated data unit including the first data unit and a second data unit.

Block 860 may include determining, by the storage controller, whether a size of the aggregated data unit is larger than a target size threshold. Block 870 may include, in response to a determination that a size of the aggregated data unit is larger than a target size threshold, replacing in the manifest, by the storage controller, the first data unit and the second data unit with the aggregated data unit. Blocks 810-870 may correspond generally to the examples described above with reference to instructions 710-760 (shown in FIG. 7).

FIG. 9—Example Machine-Readable Storage Medium

FIG. 9 shows a machine-readable storage medium 900 including instructions 910-950, in accordance with some implementations. The instructions 910-950 can be executed by a single processor, multiple processors, a single processing engine, multiple processing engines, and so forth. The machine-readable medium 900 may be a non-transitory storage medium, such as an optical, semiconductor, or magnetic storage medium. The instructions 910-950 may correspond generally to the examples described above with reference to instructions 710-760.

Instruction 910 may be executed to receive a data stream to be stored in persistent storage of a deduplication storage system, where the data stream comprises a plurality of locality portions each comprising a plurality of data units. Instruction 920 may be executed to determine whether an average unit size of the set of data units is smaller than a minimum size threshold.

Instruction 930 may be executed to, in response to a determination that the average unit size of the set of data units is smaller than the minimum size threshold, identify a first data unit, of the set of data units, that is smaller than the minimum size threshold. Instruction 940 may be executed to generate an aggregated data unit including the first data unit and a second data unit. Instruction 950 may be executed to, in response to a determination that a size of the aggregated data unit is larger than a target size threshold, replace, in the manifest, the first data unit and the second data unit with the aggregated data unit.

CONCLUSION

In accordance with some implementations of the present disclosure, a controller of a deduplication storage system may receive a set of data units, and may record the order of the set of data units in a manifest. The controller may calculate the average unit size of the set of data units, and may compare the average unit size to a minimum size threshold. If the average unit size is smaller than a minimum size threshold, the controller may perform an aggregation process for the set of data units. For example, the controller may traverse through the set of data units, and may compare the data units to the minimum size threshold. Upon identifying a first data unit that is smaller than the minimum size threshold, the controller may aggregate the first data unit with the following data unit(s) to generate an aggregated data unit. The controller may determine whether the size of the aggregated data unit satisfies a target size threshold. If not, the controller may continue the aggregation process until the size of the aggregated data unit satisfies the target size threshold. Once the size of the aggregated data unit satisfies the target size threshold, the controller may update the manifest to record the aggregated data unit. Subsequently, the controller may continue the traversal through the reminder of the set of data units, and may repeat the aggregation process for any other data units that are smaller than the minimum threshold. After completing the traversal, the controller may store the manifest and the modified set of data units in persistent storage. In this manner, the average unit size of the set of data units may be increased to correspond to the target size of the storage system. Accordingly, some implementations may allow the data units to be effectively deduplicated, and may thereby improve the performance of the storage system.

Note that, while FIGS. 1A-9 show various examples, implementations are not limited in this regard. For example, referring to FIG. 1A, it is contemplated that the storage system 100 may include additional devices and/or components, fewer components, different components, different arrangements, and so forth. In another example, it is contemplated that the functionality of the storage controller 110 described above may be included in any another engine or software of storage system 100. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computing device comprising:

at least one processor;

a memory; and at least one machine-readable storage medium comprising instructions executable by the at least one processor to:

receive a data stream to be stored in persistent storage of a deduplication storage system;

record, in a manifest, an arrival order of a set of data units included in the data stream;

determine whether an average unit size of the set of data units is smaller than a minimum size threshold;

in response to a determination that the average unit size of the set of data units is smaller than the minimum size threshold, identify a first data unit, of the set of data units, that is smaller than the minimum size threshold;

generate an aggregated data unit comprising the first data unit and a second data unit; and in response to a determination that a size of the aggregated data unit is larger than or equal to a target size threshold, replace, in the manifest, the first data unit and the second data unit with the aggregated data unit.

2. The computing device of claim 1, wherein the second data unit immediately follows the first data unit in the arrival order of the set of data units.

3. The computing device of claim 2, including instructions executable by the at least one processor to:

in response to a determination that the size of the aggregated data unit is smaller than the target size threshold, generate a second aggregated data unit comprising the first data unit, the second data unit, and a third data unit, wherein the third data unit immediately follows the second data unit in the arrival order of the set of data units.

4. The computing device of claim 3, including instructions executable by the at least one processor to:

in response to a determination that a size of the second aggregated data unit is larger than or equal to the target size threshold, replace, in the manifest, the first data unit, the second data unit, and the third data unit with the second aggregated data unit.

5. The computing device of claim 1, including instructions executable by the at least one processor to:

in response to the determination that the average unit size of the set of data units is smaller than the minimum size threshold, initiate a traversal of the set of data units according to the arrival order;

select the first data unit during the traversal;

in response to a selection of the first data unit during the traversal, determine whether the first data unit is smaller than the minimum size threshold; and in response to a determination that the first data unit is smaller than the minimum size threshold, aggregate the first data unit and the second data unit to generate the aggregated data unit.

6. The computing device of claim 5, including instructions executable by the at least one processor to:

after completing the traversal of the set of data units, store the manifest and the aggregated data unit in the persistent storage of the deduplication storage system.

7. The computing device of claim 6, including instructions executable by the at least one processor to:

after completing the traversal of the set of data units, generate a fingerprint for the aggregated data unit;

populate the fingerprint for the aggregated data unit in a container index; and store the container index in the persistent storage of the deduplication storage system.

8. The computing device of claim 5, including instructions executable by the at least one processor to:

prior to initiating the traversal of the set of data units, identify, from among the set of data units, a subset of data units that have hook point fingerprints; and exclude the identified subset of data units from the traversal of the set of data units.

9. The computing device of claim 1, wherein the minimum size threshold and the target size threshold are configuration settings of the deduplication storage system.

10. A method comprising:

receiving, by a storage controller of a deduplication storage system, a data stream to be stored in persistent storage of the deduplication storage system;

recording in a manifest, by the storage controller, an arrival order of a set of data units included in the data stream;

determining, by the storage controller, whether an average unit size of the set of data units is smaller than a minimum size threshold;

in response to a determination that the average unit size of the set of data units is smaller than the minimum size threshold, identifying, by the storage controller, a first data unit, of the set of data units, that is smaller than the minimum size threshold;

generating, by the storage controller, an aggregated data unit including the first data unit and a second data unit;

determining, by the storage controller, whether a size of the aggregated data unit is larger than a target size threshold; and in response to a determination that a size of the aggregated data unit is larger than a target size threshold, replacing in the manifest, by the storage controller, the first data unit and the second data unit with the aggregated data unit.

11. The method of claim 10, comprising:

in response to a determination that the size of the aggregated data unit is smaller than the target size threshold, generating a second aggregated data unit comprising the first data unit, the second data unit, and a third data unit, wherein the second data unit immediately follows the first data unit in the arrival order of the set of data units, and wherein the third data unit immediately follows the second data unit in the arrival order of the set of data units.

12. The method of claim 11, comprising:

in response to a determination that a size of the second aggregated data unit is larger than or equal to the target size threshold, replace, in the manifest, the first data unit, the second data unit, and the third data unit with the second aggregated data unit.

13. The method of claim 10, comprising:

in response to the determination that the average unit size of the set of data units is smaller than the minimum size threshold, initiating a traversal of the set of data units according to the arrival order;

selecting the first data unit during the traversal;

in response to a selection of the first data unit during the traversal, determining whether the first data unit is smaller than the minimum size threshold; and in response to a determination that the first data unit is smaller than the minimum size threshold, aggregating the first data unit and the second data unit to generate the aggregated data unit.

14. The method of claim 13, comprising, after completing the traversal of the set of data units:

storing the manifest and the aggregated data unit in the persistent storage of the deduplication storage system;

generating a fingerprint for the aggregated data unit;

populating the fingerprint for the aggregated data unit in a container index; and storing the container index in the persistent storage of the deduplication storage system.

15. A non-transitory machine-readable storage medium comprising instructions executable by at least one processor to:

receive a set of data units to be stored in persistent storage of a deduplication storage system;

determine whether an average unit size of the set of data units is smaller than a minimum size threshold;

in response to a determination that the average unit size of the set of data units is smaller than the minimum size threshold, identify a first data unit, of the set of data units, that is smaller than the minimum size threshold;

generate an aggregated data unit comprising the first data unit and a second data unit; and in response to a determination that a size of the aggregated data unit is larger than or equal to a target size threshold, replace, in the set of data units, the first data unit and the second data unit with the aggregated data unit.

16. The non-transitory machine-readable medium of claim 15, including instructions executable by the at least one processor to:

record, in a manifest, an arrival order of the set of data units;

in response to the determination that the size of the aggregated data unit is larger than or equal to the target size threshold, replace, in the manifest, the first data unit and the second data unit with the aggregated data unit.

17. The non-transitory machine-readable medium of claim 15, including instructions executable by the at least one processor to:

in response to a determination that the size of the aggregated data unit is smaller than the target size threshold, generate a second aggregated data unit comprising the first data unit, the second data unit, and a third data unit, wherein the second data unit immediately follows the first data unit in the arrival order of the set of data units, and wherein the third data unit immediately follows the second data unit in the arrival order of the set of data units.

18. The non-transitory machine-readable medium of claim 17, including instructions executable by the at least one processor to:

in response to a determination that a size of the second aggregated data unit is larger than or equal to the target size threshold, replace, in the manifest, the first data unit, the second data unit, and the third data unit with the second aggregated data unit.

19. The non-transitory machine-readable medium of claim 15, including instructions executable by the at least one processor to:

in response to the determination that the average unit size of the set of data units is smaller than the minimum size threshold, initiate a traversal of the set of data units according to the arrival order;

select the first data unit during the traversal;

in response to a selection of the first data unit during the traversal, determine whether the first data unit is smaller than the minimum size threshold; and in response to a determination that the first data unit is smaller than the minimum size threshold, aggregate the first data unit and the second data unit to generate the aggregated data unit.

20. The non-transitory machine-readable medium of claim 15, wherein the minimum size threshold and the target size threshold are configuration settings of the deduplication storage system.

* * * * *